(No Model.) 2 Sheets—Sheet 1.
T. HIATT.
MACHINE FOR SIZING AND ASSORTING ORANGES.
No. 369,939. Patented Sept. 13, 1887.
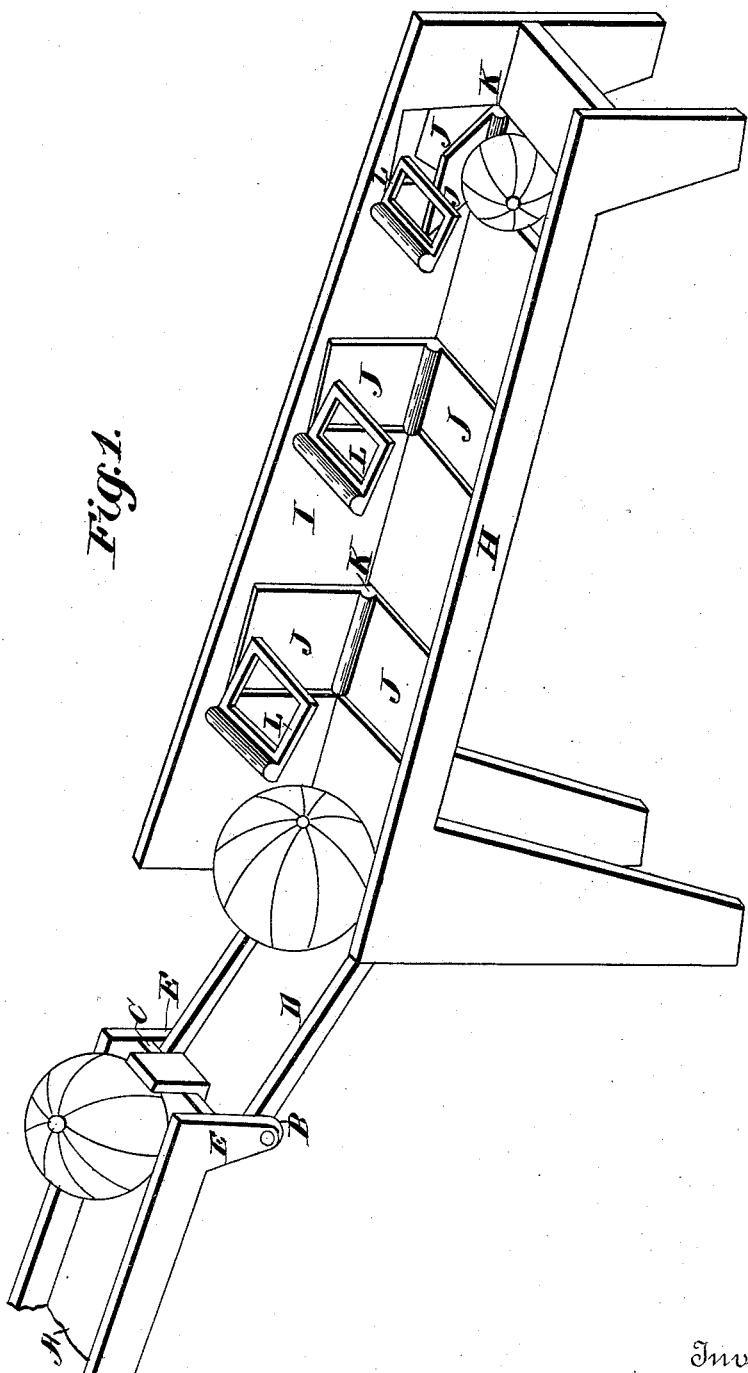

(No Model.) 2 Sheets—Sheet 2.
T. HIATT.
MACHINE FOR SIZING AND ASSORTING ORANGES.
No. 369,939. Patented Sept. 13, 1887.
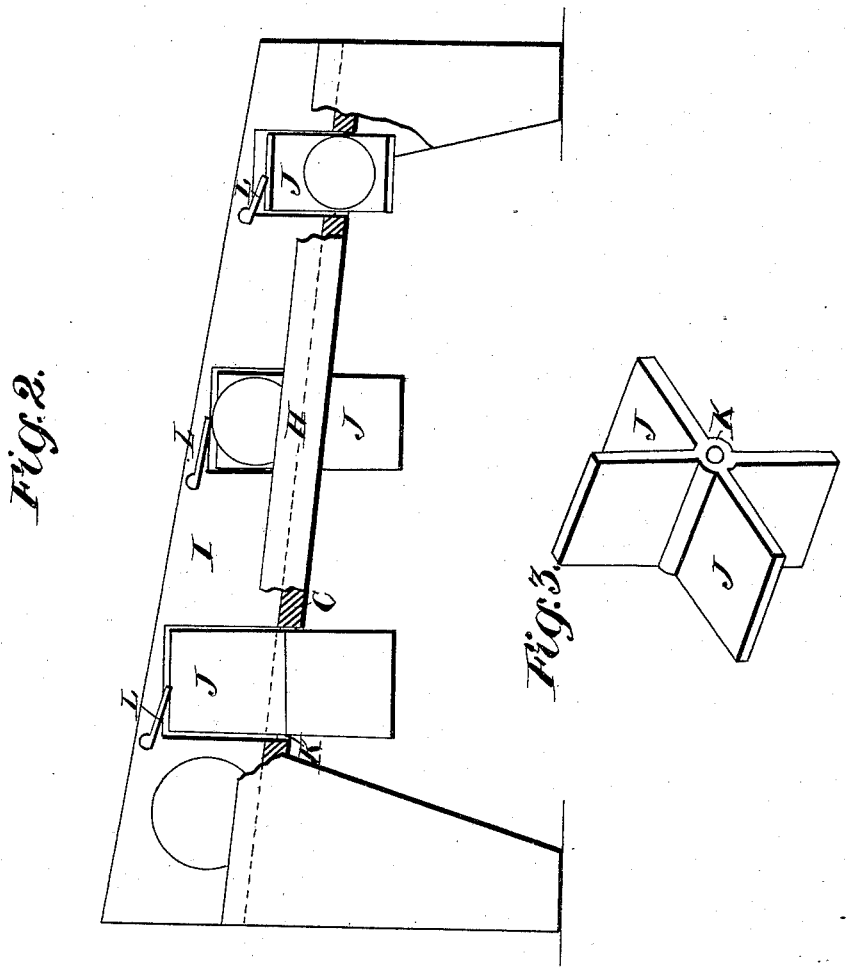
Witnesses
Fred. Keller
John J. Cary
Inventor
Thomas Hiatt
By Daniel Breed Attorney

UNITED STATES PATENT OFFICE.

THOMAS HIATT, OF LEESBURG, FLORIDA.

MACHINE FOR SIZING AND ASSORTING ORANGES.

SPECIFICATION forming part of Letters Patent No. 369,939, dated September 13, 1887.

Application filed August 23, 1887. Serial No. 247,677. (No model.)

*To all whom it may concern:*

Be it known that I, THOMAS HIATT, of Leesburg, Sumter county, and State of Florida, have made a new Machine for Automatically Sizing and Separating Oranges and other Fruit, of which the following is a specification.

My invention relates to certain new and useful improvements in automatic fruit-assorters, and has for its object to provide a device for this purpose, which shall quickly and accurately assort any fruit which is capable of rolling down an incline; and with these ends in view my invention consists in the details of construction and combination of elements, hereinafter explained, and then specifically set forth in the claim.

In order that those skilled in the art to which my invention appertains may fully understand its construction and operation, I will proceed to describe the same in detail, referring by letter to the accompanying drawings, forming a part of this specification, in which—

Figure 1 is a perspective of my device in operation. Fig. 2 is a side elevation, partly broken away, showing the sizing-gages and the escapements. Fig. 3 is a detail perspective of the escapement.

Similar letters denote like parts in the several figures of the drawings.

In Fig. 1, the letters A, B, C, D, and E designate the various parts of a feed-regulating device for controlling the flow of fruit to my improved assorter. I do not make any claim in this application to the parts of said feed-regulator, having filed a separate application therefor, Serial No. 228,419, and date of filing February 21, 1887.

G is an assorting-board having sides H I, by which the fruit when delivered upon said board will be guided in a straight line as it rolls from front to rear. The side I may have cut therein any suitable number of openings, three being shown in the drawings. Similar openings are formed in the bottom of the board, through which the fruit is to pass as it is gaged.

J are escapements having four wings joined at a common center, K, forming crosses. These escapements are journaled in line with the angle formed by the bottom and wall I of the troughs, and within the angle of the openings in the bottom and side of the assorting-board, as seen in Fig. 1, so as to form a continuation of said board and side, thus allowing the fruit to pass unobstructed in its travel down the board.

The escapements are prevented from revolving in the passage of the fruit by the gages L, which are pivoted to the sides I and H and normally rest in the path of the upper wings of the escapements. The gages extend out over the assorting-board, and vary in height therefrom, the one nearest the front being the highest, and gradually lowering as they approach the rear, the object of my invention being to assort oranges or other fruit mechanically and avoid the tedious hand-work.

From the foregoing description the operation of my improvement will be obviously as follows: An orange having been delivered on the assorting-board, will roll forward, on account of the incline of said board, and pass under the several gages until it reaches one too low for it to pass without raising the same, which it will do when it reaches the front edge of the escapement. Now, as the raising of the gage by the orange frees the upper end of the escapement, the weight of said orange will cause the escapement to revolve, precipitating the orange in any suitable receptacle placed beneath the opening. As the orange falls, the gage is allowed to return to its normal position within the path of the next highest wing of the escapement, and when the said wing reaches the vertical plane of the side I its movement will be arrested by the gage, and as the wings are at right angles to each other the opening in the board will be bridged. By this arrangement of the gages and the escapements the largest oranges leave the assorting-board first, as the smaller pass under the gages without touching them. This is a great advantage, as the largest oranges would acquire great momentum if permitted to travel the whole length of the board, and in that event be bruised by being suddenly arrested.

Heretofore it has been difficult to gage and assort fruit of this description, principally on account of the crowding and choking of some of the devices used for that purpose; but it will be clear from the above description that my device will entirely obviate these difficulties and accurately gage and assort any and all fruit capable of descending an incline surface.

Of course I do not desire to be limited to the exact construction shown, as the shape or design of the frame-work might be varied indefinitely, according to the taste of the manufacturer, without departing from the spirit of my invention.

Having described my invention, what I claim is—

In a fruit-assorting device, the combination, with an inclined assorting-board, having different sized openings and an inclined side extension with similar adjacent openings, of revolving escapements journaled within said openings, and swinging stop-gages horizontally secured to the side extensions above said openings, substantially as and for the purposes set forth.

In testimony whereof I affix my signature in presence of two witnesses.

THOMAS HIATT.

Witnesses:
DANIEL BREED,
EMMA M. GILLETT.